United States Patent
Hamill

(10) Patent No.: US 7,769,217 B2
(45) Date of Patent: Aug. 3, 2010

(54) FAST ITERATIVE 3D PET IMAGE RECONSTRUCTION USING A SET OF 2D LINOGRAM TRANSFORMATIONS

(75) Inventor: James J. Hamill, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 819 days.

(21) Appl. No.: 11/714,406

(22) Filed: Mar. 6, 2007

(65) Prior Publication Data

US 2007/0230762 A1  Oct. 4, 2007

Related U.S. Application Data

(60) Provisional application No. 60/779,530, filed on Mar. 6, 2006.

(51) Int. Cl.
*G06K 9/00* (2006.01)
(52) U.S. Cl. .................................. 382/131; 382/128
(58) Field of Classification Search ............. 382/128, 382/131
See application file for complete search history.

(56) References Cited

U.S. PATENT DOCUMENTS 7,120,283 B2 * 10/2006 Thieret et al. ............... 382/131
7,394,927 B2 *  7/2008 Proksa et al. ............... 382/154
2003/0190065 A1 * 10/2003 Hamill et al. ............... 382/131

OTHER PUBLICATIONS

"Linograms in Image Reconstruction from Projections", by Edholm, Paul R.; Herman, Gabor T.; Medical Imaging, IEEE Transactions on vol. 6 , Issue: 4; Digital Object Identifier: 10.1109/TMI.1987.4307847; Publication Year: 1987 , pp. 301-307.*

"3D-reconstruction using cone-beam backprojection, the Radon transform and linogram techniques", by Axelsson-Jacobson, C.; Defrise, M.; Danielsson, P.-E.; Clack, R.; Noo, F.; Nuclear Science Symposium and Medical Imaging Conference Record, 1995., 1995 IEEE vol. 3; Digital Object Identifier: 10.1109/NSSMIC.1995.500247; Publication Year: 1995 , P.*

"Fast PET EM reconstruction from linograms", by Hamill, J.; Michel, C.; Kinahan, P.; Nuclear Science, IEEE Transactions on vol. 50 , Issue: 5 , Part: 2; Digital Object Identifier: 10.1109/TNS.2003.817405; Publication Year: 2003 , pp. 1630-1635.*

"Fast fully 3-D image reconstruction in PET using planograms", by Brasse, D.; Kinahan, P.E.; Clackdoyle, R.; Defrise, M.; Comtat, C.; Townsend, D.W.; Medical Imaging, IEEE Transactions on vol. 23 , Issue: 4; Digital Object Identifier: 10.1109/TMI.2004.824231; Publication Year: 2004 , pp. 413-425.*

* cited by examiner

*Primary Examiner*—Tom Y Lu
(74) *Attorney, Agent, or Firm*—Peter L. Kendall

(57) ABSTRACT

A method for performing accurate iterative reconstruction of three dimensional image data sets based on Approximate Discrete Radon Transformation (ADRT) using two dimensional linograms for each of a plurality of defined planes tilted from the (x, y, 0) plane by a tilt angle and orientation angle. Image data is arranged with respect to the defined tilted planes ADRT and its inverse are implemented to provide exactly matched forward and backward projectors suitable for the Maximum-Likelihood Expectation-Maximization (ML-EM) reconstruction in PET. An EM reconstruction algorithm is accomplished by initializing an estimation image.

11 Claims, 4 Drawing Sheets

FAST ITERATIVE 3D PET IMAGE RECONSTRUCTION USING A SET OF 2D LINOGRAM TRANSFORMATIONS

CROSS-REFERENCE TO RELATED APPLICATION AND CLAIM FOR PRIORITY

This application claims priority under 35 U.S.C. §119(e) of copending provisional application Ser. No. 60/779,530 filed Mar. 6, 2006.

BACKGROUND OF THE INVENTION

1. Field of the Invention

The present application relates to nuclear medical imaging, and more particularly to methods and apparatus for reconstructing nuclear medical images from three-dimensional PET acquisition data using linograms.

2. Related Art

Gamma cameras, also referred to as nuclear imaging cameras, radioisotope cameras, scintillation cameras and Anger cameras, are used to measure gamma radiation emitted by a body under examination. By measuring the energy and the location of the gamma ray emissions, an image representative of the gamma radiation emitted from the body under examination can be created.

In the field of positron emission tomography (PET), opposing detectors detect the emission from annihilation of a positron of a pair of simultaneous gamma photons traveling in opposite directions. Typically, a large number of scintillation detectors (e.g., scintillation crystal detectors) are arranged in rings. The PET electronics determine when two oppositely arranged detectors produce an event signal at essentially the same time, indicating that a pair of annihilation gamma rays has been detected. The emitted positron that was the source of the pair of gamma rays is considered to be located on a line of response (LOR) connecting the locations on each detector where each gamma ray was detected. The principle is illustrated by FIG. 1, where four detectors are shown for simplicity of explanation.

The emission source causes coincidences between detectors A and D, and between B and C, but not between A and C, or B and D. The x and y coordinates of the source (see FIG. 2) are determined by the crossing point of the active LORs connecting the points on each detector where the coincident gammas were detected. The z coordinate is the coordinate of the plane in which the detectors all lie. Through the use of hundreds of detectors in each ring, this triangulation principle can be used to build an image via the well-studied science of tomographic reconstruction.

In PET, one attempts to reconstruct three dimensional objects by using measurements of line integrals through the measurement space. FIG. 2 shows as an example one small part of the image, a source point that can be characterized by three coordinates $(x_s, y_s, z_s)$. The PET reconstruction problem is to measure the emission intensity of all such points in the image measurement space.

In practice, instrument designers increase the z sampling by operating the detectors three dimensionally. Coincidences are recorded between detectors that are not in a common plane. If one detector has coordinate $z_1$ and a coincident detector has coordinate $z_2$, the simplest approximate formula for the source z coordinate is $z_s=(z_1+z_2)/2$. This approximation has been called single-slice rebinning. The well-known Fourier rebinning method or FORE, is another approach, and is still used in most of the clinical 3D PET performed around the world.

Grouping lines of response into a plane of constant z, with techniques like the ones mentioned in the last paragraph, leads to faster reconstructions. Two-dimensional reconstruction methods are normally much faster than 3D reconstructions. The speed advantage is important because current PET image reconstruction uses iterative techniques, in which image fidelity tends to improve as one uses more iterations, yet one is forced to stop the iterations before convergence is attained, so that the image can be delivered to the physician in an acceptable amount of time.

It is well-known that the ML-EM (Maximum Likelihood Expectation Maximization) (or simply "EM") iterative algorithm provides very good PET image reconstruction, but it has been considered too slow for clinical use. A primary drawback for using the ML-EM method is that it requires, in principle, an infinite number of cycles, or iterations, to converge to the answer. The subsequent development of acceleration techniques such as Ordered Subset Expectation Maximization (OSEM), and the development of Fourier rebinning for transforming 3D PET sinograms into 2D sinograms, made iterative reconstruction clinically feasible by allowing approximations to be used in the algorithm. However, factors such as convergence and the limit-cycle effect still presented arguments in favor of EM.

The present inventors have previously provided a method combining EM with the Approximate Discrete Radon Transform (ADRT), as disclosed by M. L. Brady in "A fast discrete approximation algorithm for the Radon transform," SIAM J. Comput., Vol. 27, no 1, p 107-119, February 1998. See Published U.S. Patent Application No. 2003/0190065, published Oct. 9, 2003, incorporated herein by reference in its entirety. This new method allowed EM reconstructions to be accelerated by orders of magnitude, thereby generating results in about the same time as OSEM.

However, there remains a need in the art to accelerate image reconstruction calculations even further, and to provide image reconstruction methods for 3D PET images.

SUMMARY OF THE INVENTION

The present invention improves upon the prior art by providing a PET image reconstruction method that is significantly faster than known methods such as OSEM, and further is capable of reconstructing 3D PET image data.

BRIEF DESCRIPTION OF THE DRAWINGS

The preferred embodiments of the present invention are shown by a way of example, and not limitation, in the accompanying figures, in which.

DETAILED DESCRIPTION OF THE INVENTION

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Figure 3:
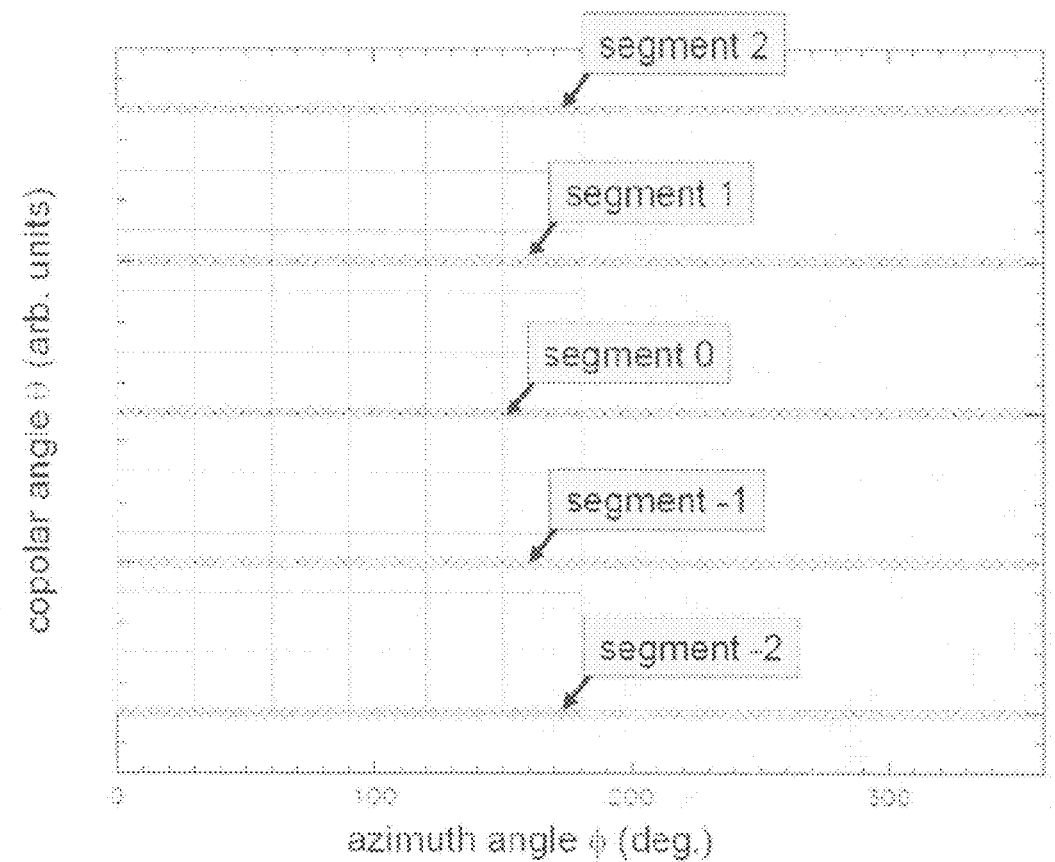
FIG. 3 is a graph showing conventional Orlov-sphere representation of three-dimensional PET data.

The usual organization of 3D PET data can be explained in terms of the Orlov sphere. FIG. 3 shows "the tropics" of the Orlov sphere, i.e. the region near the equator, with the horizontal axis representing the azimuth angle of sinograms and the vertical axis representing the copolar angle. The measurement space extends from 0 to 180 degrees in azimuth, and in the copolar degree of freedom it extends over a range of angles determined by the arrangement of detectors and by the detection electronics.

Whereas 3D PET LORs are characterized by radial, azimuthal, copolar, and axial coordinates $(r, \phi, \theta, z)$, the Orlov sphere is used to represent a "view" of this dataset, i.e. the collection of all $(r, z)$ values in the specified angular direction $(\theta, \phi)$. Any Orlov-sphere coordinate $(\phi, \theta)$ in excess of $\phi=180$ degrees, or $\pi$ radians, represents the same information as the antipodal point $(\phi-\pi, -\theta)$, since the two points represent the same line through space, except drawn in the opposite direction.

3D PET measurements are traditionally gathered into segments, represented by the segment curves in FIG. 3, which shows the case of five segments as obtained in high resolution PET/CT scanners manufactured by Siemens Medical Solutions. Each point $(r, \phi, s, z)$ in the segment represents a sum of the information gathered over a range of copolar angles. A segment index, s, has replaced the copolar angle $\theta$. The collection of points in segment 0, comprising the equator of the Orlov sphere, defines LORs that fall in parallel planes. Backprojection from segment 0 defines a series of lines that all fall in one plane. However, the LORs of segment ±1, segment ±2, etc. cross through 3D space in a way that doe not define planes. Backprojection from any of these segments leads to a series of lines that do not intersect as they pass through three-dimensional space. This is why correct use of data in the oblique segments is challenging.

Figure 4:
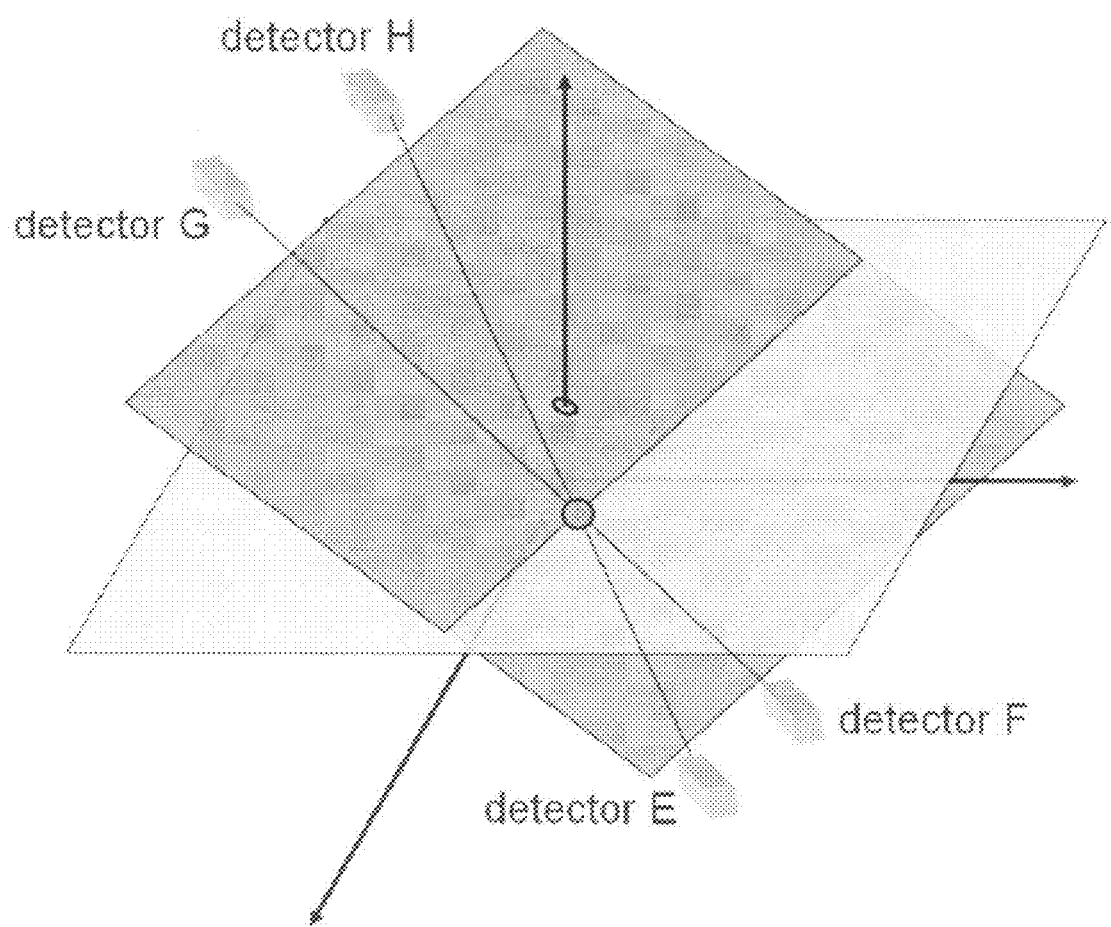
FIG. 4 is a plan diagram illustrating a tilted plane coordinate system for identifying three-dimensional PET data in accordance with one embodiment of the invention.

Instead of using the coordinates $(x_s, y_s, z_s)$ described above, the present invention uses other coordinates. According to one embodiment of the invention, a tilted plane can be used as shown in FIG. 4. Such a plane is characterized by a z intercept, a tilt angle, and an orientation angle. To specify the source's location in this two-dimensional tilted plane, two coordinates are required. Preferably, it is advantageous to use the same x and y axes as the original plane of the PET detectors. A third coordinate is then required to locate the source in 3D. A preferred choice for this coordinate is the tilted plane's intercept with the z axis of the PET detector plane.

Figure 1:
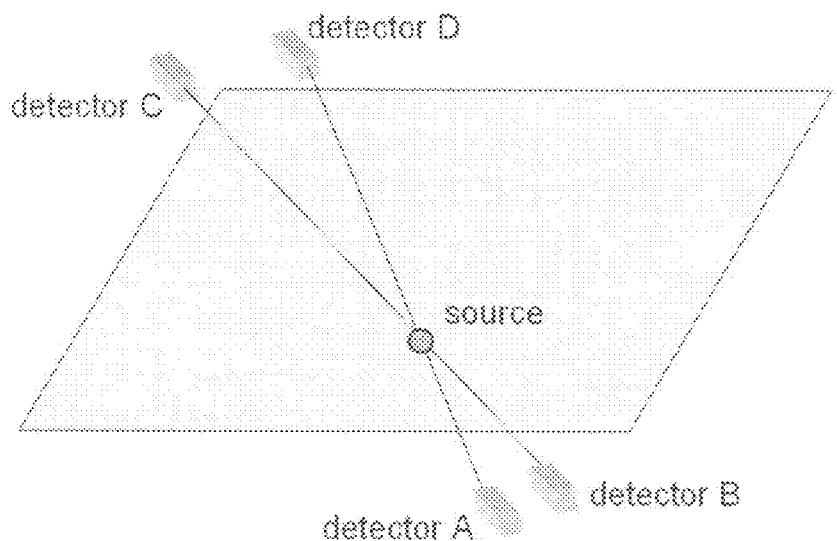
FIG. 1 is a plan diagram illustrating a conventional PET detector configuration.
Figure 2:
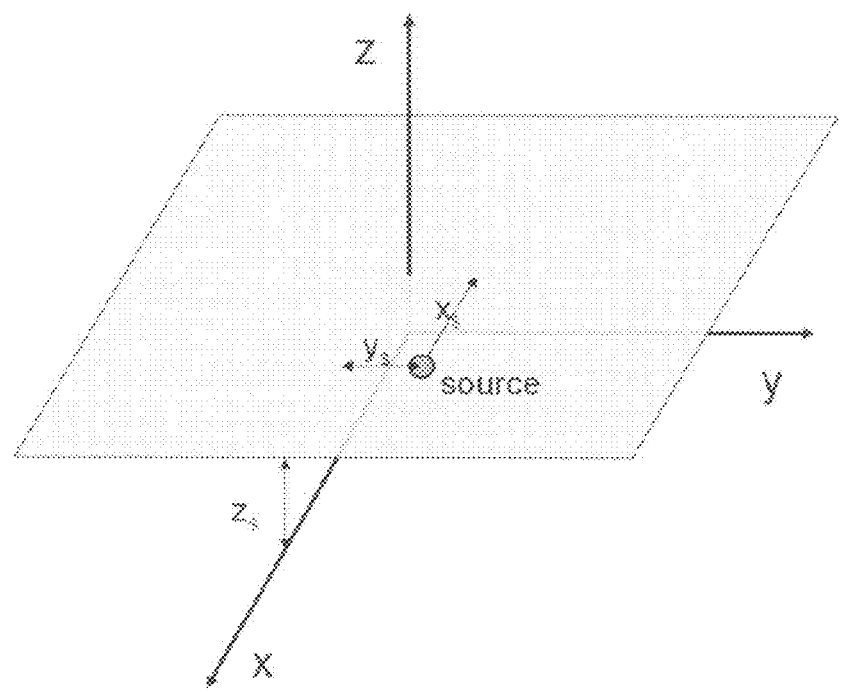
FIG. 2 is a plan diagram illustrating a conventional spatial coordinate system for identifying the spatial location of a source of gamma emissions to be imaged.

As suggested by FIG. 4, information about the source's location is obtained by recording coincidences between sets of detectors that lie in this plane. In analogy to the situation represented by FIG. 1, the source causes coincidences between detectors E and H, and between F and G, but not between E and G or F and H. The x and y coordinates of the source (see FIG. 2) are determined by the crossing point of the active lines of response. The z coordinate is related to the z intercept of the tilted plane through a mathematical formula.

Figure 5:
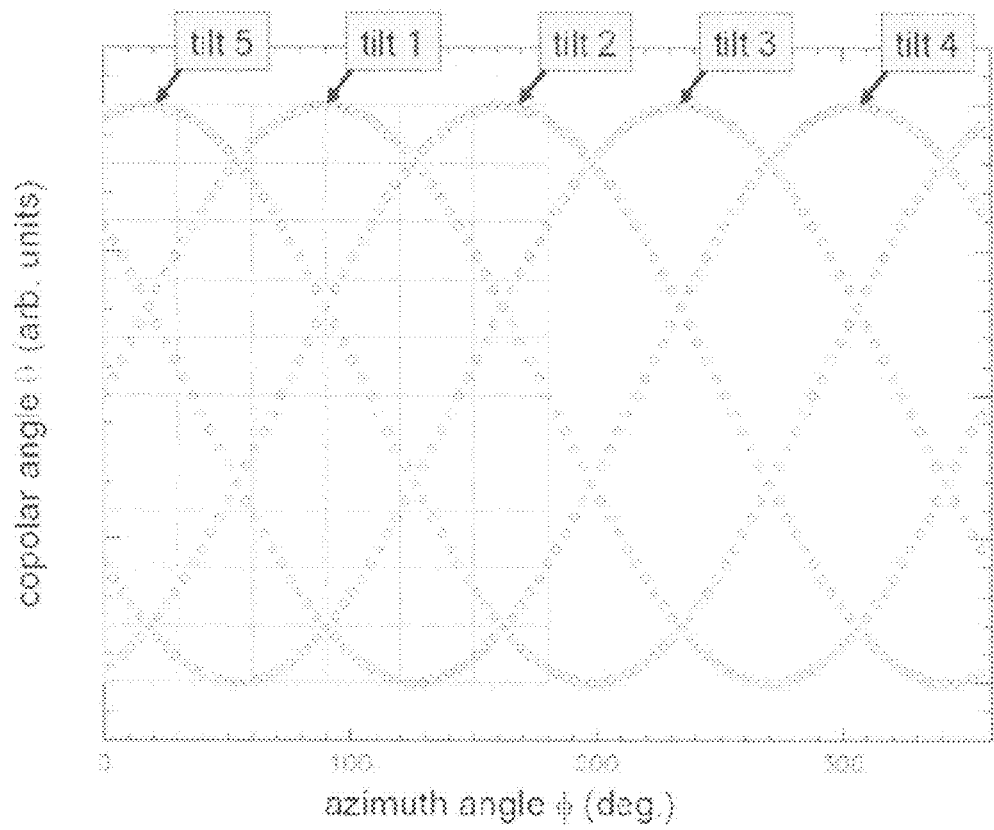
FIG. 5 is a graph showing a modified Orlov-sphere representation of three-dimensional PET data for a tilted plane coordinate system in accordance with one embodiment of the invention.

Again, the Orlov sphere is useful to explain the data organization. The inventive concept is to span the same space of measurements (0 to 180 degrees in azimuth, and a fixed range of the copolar angle) with a set of curves, as shown by FIG. 5. Instead of $(r, \phi, s, z)$ as in conventional 3D PET, we use parameters $(r, \phi, \psi, z)$ to identify points, and the points are grouped to lie on sinuous curves. Each curve represents the equator of a tilted sphere, with the angular parameter $\psi$ specifying the orientation of the tilted planes. As in the usual approach to 3D PET, each point on the curve represents a range of copolar angles.

Although the space we work with is three dimensional, this approach is two dimensional, in the sense that each curve corresponds to measurements across parallel planes as shown in FIG. 4. Our new parameterization has the unusual and complicating features of data redundancy where the curves cross, and variable spacing between samples, i.e. non-constant $\theta$ spacing.

We will use the following definition for the tilted planes. Let $(x, y, z)$ be coordinates of a point in the ordinary space used by PET scanners today. A tilted plane is defined by its z intercept, by a specified tilt angle $\tau$, and by an orientation angle $\psi$. We will continue to use the same x and y coordinates for points in the tilted planes, but we identify the third spatial dimension through a parameter $z'(\psi)$ which represents the z-intercept, in the original space, of the tilted plane:

$$z'(\psi) = z + \tan \tau \times (y \cos \psi - x \sin \psi) \qquad (1)$$

The $(x, y, z'(\psi))$ coordinates are not orthogonal. Nevertheless, one can represent points in space uniquely in this representation, and fast linogram transformations can be performed with suitable Jacobian transformations to relate normal 3D Cartesian coordinates to the tilted-plane coordinates.

This tilted-planes approach to 3D PET has the following features.

(1) Organization of the Measured Projections

In the data recording procedure, or alternatively as a postprocessing step, the LORs are organized so as to lie on planes identified, on the Orlov sphere, with tilted equators. This approach to organizing the data will work well in the case of continuous or quasi-continuous motion of the patient bed. Moreover, LORs can be directly transformed into a linogram representation.

> There are two approaches to handling the redundancies which are noted above. Both approaches are supported in the present invention. The first approach is to allow the same measured values to be present in more than one tilted-plane representation. The second approach is to stochastically or deterministically assign each event into just one tilted-plane representation.
>
> The number of tilted planes is not specified as a fixed parameter in the invention. More planes correspond to better sampling of the LORs. Fewer planes correspond to faster reconstruction and easier data handling.

(2) Modified EM-ADRT Reconstruction

The EM-ADRT algorithm, as described in the '065 published application cited above, is exercised, with modifications:

> In the forward projection step, voxel values are interpolated from $(x, y, z)$ to $(x, y, z'(\psi))$ using interpolation coefficients.
>
> After forward projection, the Jacobian of transformation from 3D Cartesian coordinates to the tilted-planes representation is applied.

The algorithm loops over linogram coordinates and also over tilt angles $\psi$ and plane indices $z'(\psi)$.

After backprojection, the same interpolation coordinates used in forward projection are applied to transform from $(x, y, z'(\psi))$ to $(x, y, z)$. By using the same coefficients, the forward and backward projectors are matched, as they should be in an ML-EM reconstruction according to the mathematical formalism.

Specifically, to summarize from said '065 publication, a two-dimensional EM (2D EM) reconstruction algorithm is driven by a linogram $L_{u,v}$ of size $3N \times (2N-4)$, where N is a power of 2, for each tilt plane. Each pixel in the matrix of size $N \times N$ is given an initial value. Pixel values (x,y) are denoted in iteration i by the symbol $\lambda_{x,y,*}^{i}$.

A reciprocal back projection of the projection weights is then formed from the following equation:

$$B_{x,y} = \frac{1}{A^T\left\{\frac{1}{1+v^2}\right\}}$$

where $A^T$ is an adjoint ADRT projector, or back projector of the ADRT, and $B_{x,y}$ is referred to as the normalization image. By modifying this equation, normalization and attenuation-weighting can be included in the reconstruction in order to achieve a better image quality.

Next, a loop is begun over iterations i. The estimate is then forward projected into linogram coordinates using the equation:

$$P_{u,v}^{i} = A\{\lambda_{x,y}^{i}\}$$

where A is the ADRT forward projector.

In all linogram bins (u,v) the correction ratio:

$$C_{u,v} = \frac{L_{u,v}}{P_{u,v}^i}$$

if $P_{u,v}^{i}$ exceeds the value $\epsilon$, $C_{u,v}=0$ otherwise is formed. In this equation, $\epsilon$ is a small constant value.

The correction factors are back projected and the normalization image is applied, as in the following equation:

$$\lambda_{x,y}^{i+1} = \lambda_{x,y}^{i} B_{x,y} A^T\{C_{u,v}\}$$

Finally, the loop described above is closed. Specifically, after the correction factors are back projected and the normalization image is applied, the method returns to the step of back projecting the projection weights.

Forward projection of a half-image $I(x,y)$ at angles between 0 and $\pi/4$ radians is accomplished as follows. Two image buffers, R, with $(N_X+N_Y)$ columns and $N_Y$ rows are defined. The additional columns are needed because, although the linogram projection of rectangular space spans only $N_X$ bins at zero degrees, an additional $N_Y$ bins are needed for the projection at angles up to $\pi/4$ radians. One is identified as the "current" and one as the "previous" version of the buffer. Image values are loaded into the left columns of the "previous" buffer, leaving the rightmost $N_X$ columns empty.

(3) OSEM-ADRT Reconstruction

An ordered-subsets version of the algorithm is created when we introduce an outer looping over groups of tilted-plane orientations. For example, with reference to FIG. 5, one can first generate an image update based on tilt 1; then perform an update based on tilt 2; and so on. The order and the grouping of these subsets is not to be rigidly fixed as a part of the invention. The OSEM version of the algorithm may work best in the case of continuous bed motion, when each measurement represents the volume almost completely.

The simple z interpolation is an important feature of the new approach. Interpolation in the direction of just one axis is computationally simpler than 3D or 2D interpolation, normally required for fully 3D PET. These interpolations are a natural approach to removing distortions that arise when one uses the normal 3D PET organization (FIG. 4) and uses unsophisticated reconstruction techniques that fail to model the lines of response correctly. Interpolations may be necessary when one acquires 3D PET measurements with continuous bed motion.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for performing iterative reconstruction of three dimensional image data in (x, y, z) coordinate space comprising the steps of:

a) arranging said three dimensional image data in a linogram representation such that said data lie on a plurality of x,y planes tilted from the (x, y, 0) plane by $z'(\psi)=z+\tan \tau \times (y \cos \psi - x \sin \psi)$, where $\tau$ is a tilt angle and $\psi$ is an orientation angle;

b) forming forward projections in said linogram representation using an Approximate Discrete Radon Transform (ADRT) method; and c) forming back projections in said linogram representation using said ADRT method.

2. The method of claim 1, wherein said step of forming back projections is accomplished using a back projector which exactly matches a forward projector used to accomplish said step of forming forward projections, said ADRT method including an outer loop operating in reverse order in said step of forming back projections in relation to said step of forming forward projections.

3. The method of claim 1, wherein said image data is acquired by Positron Emission Tomography (PET) detectors.

4. The method of claim 1, wherein steps b) and c) are looped over a plurality of tilted plane orientations.

5. A method for performing iterative reconstruction of three dimensional image data in (x, y, z) coordinate space by the Maximum-Likelihood Expectation-Maximization (ML-EM) method, including the steps of:

arranging said three dimensional image data in a linogram representation such that said data lie on a plurality of x,y planes tilted from the (x, y, 0) plane by $z'(\psi)=z+\tan\tau\times(y\cos\psi-x\sin\psi)$, where $\tau$ is a tilt angle and $\psi$ is an orientation angle;

for each of said tilted planes:
  initializing an estimation image of size N×N pixels to an initial value in all said pixels;
  forming back projection of projection weights;
  beginning a loop is over i iterations;
  forward projecting pixel coordinates into linogram coordinates using an Approximate Discrete Radon Transform (ADRT) method;
  forming a correction factor in all said linogram coordinates;
  back projecting said correction factors using said ADRT method;
  applying a normalization factor; and
  repeating said steps of back projecting said correction factors and applying a normalization factor through said i iterations until a stopping criterion is satisfied.

6. The method of claim 5, wherein said step of forming back projection of projection weights is accomplished by the equation:

$$B_{x,y} = \frac{1}{A^T\left\{\frac{1}{1+v^2}\right\}}$$

where $A^T$ is an ADRT back projector.

7. The method of claim 5, wherein said step of forward projecting said pixel coordinates into linogram coordinates is accomplished using the equation;

$P_{u,v}^i = A\{\lambda_{x,y}^i\}$ where A is an ADRT forward projector.

8. The method of claim 5, wherein said step of forming a correction factor in all said linogram coordinates is accomplished using the equation:

$$C_{u,v} = \frac{L_{u,v}}{P_{u,v}^i}$$

where $P_{u,v}^i$ exceeds a preset value, and
using the equation: $C_{u,v}-0$
where $P_{u,v}^i$ does not exceed said preset value.

9. The method of claim 5, wherein said step of applying a normalization factor is accomplished using the equation: $\lambda_{x,y}^{i+1} = \lambda_{x,y}^i B_{x,y} A^T\{C_{u,v}\}$ where $\lambda_{x,y}^i$ represents the pixel value at coordinates (x,y) through iteration i, and where $\lambda_{x,y}^{i+1}$ represents the pixel value at coordinates (x,y) through iteration i+1.

10. The method of claim 5, wherein said three dimensional image data is Positron Emission Tomography (PET) data.

11. The method of claim 5, wherein said steps for each of said tilted planes are looped over said tilted plane orientations.

* * * * *